United States Patent
Büchler et al.

(10) Patent No.: US 6,337,653 B1
(45) Date of Patent: Jan. 8, 2002

(54) VEHICLE IMPACT DETECTION SENSOR SYSTEM

(75) Inventors: Josef Büchler, Pfaffenhofen; Wilfried Bullinger, Korntal-Münchingen; Markus Hartlieb, Walddorfhäslach, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/595,603

(22) Filed: Jun. 15, 2000

(30) Foreign Application Priority Data

Jun. 16, 2000 (DE) .......................................... 199 27 402

(51) Int. Cl.$^7$ ............................................... G01S 13/93
(52) U.S. Cl. ........................ 342/72; 342/114; 280/735; 340/436; 340/438; 701/45
(58) Field of Search ............................... 342/70, 71, 72, 342/104, 114, 115; 280/728.3, 735, 732, 753; 340/435, 436, 903, 438, 904; 701/45, 301, 49; 702/143; 180/169, 272, 273, 287; 297/216.12, 408

(56) References Cited

U.S. PATENT DOCUMENTS

| | | | |
|---|---|---|---|
| 3,780,314 A | * 12/1973 | Inose et al. ................. | 307/121 |
| 4,008,473 A | * 2/1977 | Hinachi et al. .............. | 342/84 |
| 5,653,462 A | * 8/1997 | Breed et al. ................ | 28/735 |
| 5,694,320 A | * 12/1997 | Breed ........................ | 701/45 |
| 5,826,216 A | * 10/1998 | Lyons et al. ............... | 702/143 |
| 5,897,135 A | * 4/1999 | Oehm ........................ | 280/728.3 |
| 5,936,549 A | * 8/1999 | Tsuchiya .................... | 340/903 |
| 6,087,928 A | * 7/2000 | Kleinberg et al. .......... | 340/436 |
| 6,088,640 A | * 7/2000 | Breed ........................ | 701/45 |
| 6,225,891 B1 | * 5/2001 | Lyons et al. ............... | 340/435 |
| 6,270,116 B1 | * 8/2001 | Breed et al. ................ | 280/735 |

FOREIGN PATENT DOCUMENTS

| | | |
|---|---|---|
| DE | G 92 15 383.6 | 11/1992 |
| DE | 42 42 230 A1 | 12/1992 |
| DE | 43 00 653 A1 | 1/1993 |
| DE | 43 22 488 A1 | 7/1993 |
| DE | 44 92 128 T1 | 3/1994 |
| DE | 195 37 383 A1 | 10/1995 |
| DE | 195 46 715 A1 | 12/1995 |
| DE | 195 47 842 A1 | 12/1995 |

* cited by examiner

Primary Examiner—John B. Sotomayor
(74) Attorney, Agent, or Firm—Crowell & Moring LLP

(57) ABSTRACT

A vehicle impact detection sensor for providing an input variable for an activation logic unit or for generating an activation signal for an active occupant protection system, has a radar transmitter and a radar receiver which are arranged on a sensor-carrying superstructure of the vehicle. The radar receiver receives radar waves which are emitted by the radar transmitter and reflected at an impact-relevant reflexion surface that moves relative to the sensor-carrying superstructure in the event of an impact. A Doppler frequency evaluation unit uses the frequency of the transmitted radar waves and the frequency of the radar waves reflected from the impact-relevant reflexion surface to determine the associated Doppler frequency and detects therefrom a relative movement of the impact-relevant reflexion surface with reference to the sensor-carrying vehicle superstructure. The impact-relevant reflexion surface is a surface permanently connected to the vehicle, preferably, an outer surface of the vehicle.

6 Claims, 2 Drawing Sheets

VEHICLE IMPACT DETECTION SENSOR SYSTEM

BACKGROUND OF THE INVENTION

The invention relates to a vehicle impact detection sensor system, in particular for providing an input variable for an activation logic unit or for generating an activation signal for an active occupant protection system.

Active restraint systems such as, for example, airbags or seat belt pretensioning devices frequently comprise a vehicle impact detection sensor system in which there are provided acceleration sensors which respond to an impact-relevant acceleration which occurs in the case of an impact accident situation. Although active restraint systems which are based on the pyrotechnic principle are capable of reacting quickly, there are accident situations such as, for example, side collisions directly into the door region of a motor vehicle in the case of which the impact is not detected by acceleration sensors positioned conventionally until relatively late.

A vehicle impact detection sensor system of the type mentioned at the beginning is disclosed in DE 195 46 715 A1. In this reference, an airbag sensor system is described which comprises a plurality of microwave sensors which in each case have a transmitting and receiving stage. These microwave sensors are arranged next to one another in a door of the body such that they monitor the adjacent external vehicle surroundings. For this purpose, they generate a frequency signal in the region of, for example, 76 GHz and scan a distance range of approximately 1 m for possible objects which are moving towards the vehicle, doing so by detecting a possibly reflected frequency signal and evaluating the latter using the Doppler frequency technique. The Doppler frequency can be used to determine the speed at which a collision object is moving towards the microwave sensors, whereupon the airbag is activated when a threshold value is exceeded.

DE 92 15 383 U1 discloses an optical crash sensor which is arranged in a door of the body and is suitable, in particular, for detecting side impact accidents in good time. This sensor comprises a light-guiding path with lenses and stops for focusing a light beam which is directed onto a phototransistor. In the case of a side impact, the light-guiding path is deformed, and this causes a change in a signal of the phototransistor, and permits a corresponding activation of active occupant protection systems. A similar side impact detection device with a light-guiding path, for example in a vehicle door, is described in the Laid-Open Patent Application DE 195 37 383 A1.

DE 43 22 488 A1 describes arranging piezoelectrically resistive pressure sensors on the door inner panel of a door in the body of a motor vehicle, which in the event of a side impact detect a sudden rise in pressure of the ambient air and thereupon activate an active occupant protection system.

The Laid-Open Patent Application DE 43 00 653 A1 describes a collision sensor which includes a device generating a magnetic field and an electric conductor which changes its position relative to the magnetic field in the event of a deformation in a vehicle part at risk of collision. The amplitude, representative of the deformation rate, of the electric voltage induced in the electric conductor by the change in position is detected and suitably evaluated.

The Laid Open Patent Application DE 42 42 230 A1 discloses a side impact detection sensor system which has an electric capacitor which forms a frequency-determining circuit element of an oscillator circuit which is connected to a frequency/voltage transformer for outputting an impact-indicative electric voltage.

A further known technique for side impact detection is to insert a strain gauge in the door region of a motor vehicle, or to position acceleration sensors on the door outer panel.

It is the object of the invention to create a vehicle impact detection sensor system of the type mentioned at the beginning which is also particularly suitable for activating an active occupant protection system protecting against side impact, and permits early activation in the process.

SUMMARY OF THE INVENTION

This object is achieved by means of a vehicle impact detection sensor system where the impact-relevant reflexion surface is characteristically a surface permanently connected to the vehicle, in particular an outer surface of the vehicle. It is possible with the aid of this sensor system quickly to detect a threatening accident situation as early as on the basis of a slight movement of the impact-relevant reflexion surface relative to the sensor-carrying vehicle superstructure, and to make use of this, for example, for the purpose of early activation of an active occupant protection system.

In a development of the invention, a detector is provided for detecting an oscillatory movement of the impact-relevant reflexion surface. It is possible in this way to avoid erroneous activation of active occupant protection systems on the basis of vibrations of the relevant vehicle outer surface.

In a development of the invention, a radar sensor is arranged in such a way that it emits radar waves into a cavity whose boundaries are formed at least partly by the impact-relevant reflexion surface. The radar receiver is arranged fittingly for this purpose such that it receives reflected radar waves from the cavity. This cavity can, for example, be one such as in the vehicle door. In this case, an incipient pressing inwards of the door outer skin causes a change in the cavity configuration for the radar waves reflected in it, and thus a corresponding Doppler frequency signal at the radar receiver. The filling of the cavity with reflected radar radiation can be used to monitor a particularly large impact-sensitive surface area.

BRIEF DESCRIPTION OF THE DRAWINGS

Further features and advantages of the invention are illustrated in the drawings and are described below. In the drawings.

DETAILED DESCRIPTION OF THE INVENTION

Figure 1A:
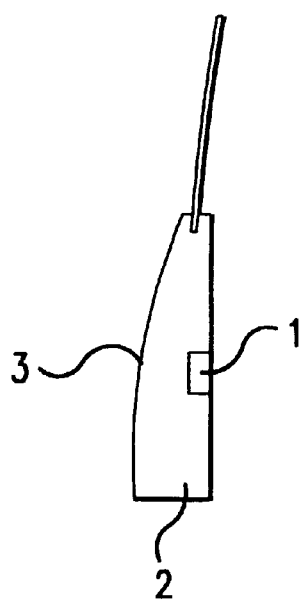
FIGS. 1a and 1b show a side and a front view, respectively, of a vehicle door with a vehicle impact detection sensor system.
Figure 1B:
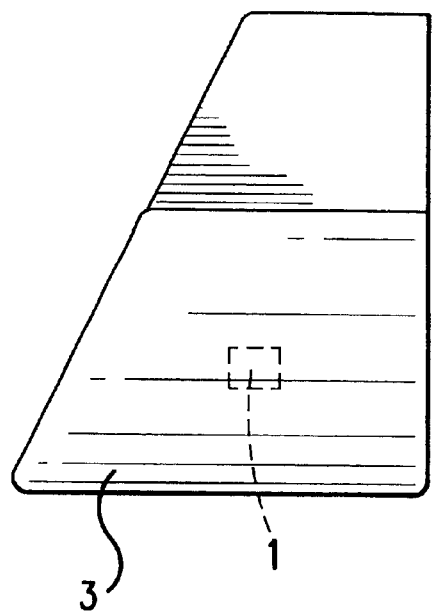

Illustrated in FIGS. 1a and 1b is a vehicle door with a vehicle impact detection sensor system 1 whose core is an integrally designed radar transmitter and receiver which is mounted on a part of the body of the vehicle door and emits radar waves, preferably in the frequency range of approximately 60 GHz, that is to say at wavelengths of approximately 5 mm, into an inner cavity 2 in the door. The emitted radar waves are multiply reflected at boundary surfaces of the inner cavity 2 which reflect microwaves and are, in particular, electrically conducting. The outside boundary surface is formed by a door outer skin 3 which represents the reflexion surface monitored for impact by the impact detection sensor system 1. The Doppler frequency, that is to say the difference between the frequency of the received, retroreflected radar waves, on the one hand, and the emitted radar waves, on the other hand, is determined from that fraction of the radar waves which passes back to the impact detection sensor system 1 because of the reflexions. A relative movement between the reflecting impact-relevant door outer skin 3 and the impact detection sensor system 1 can be inferred from the Doppler frequency.

Figure 2:
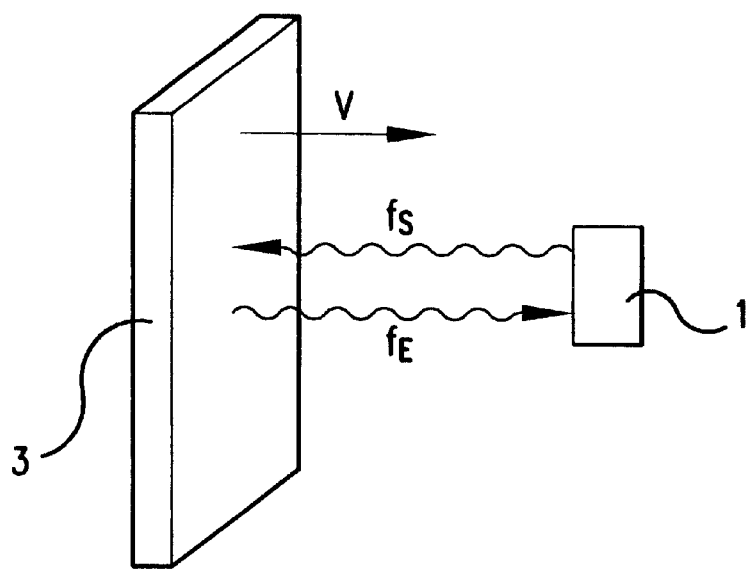
FIG. 2 shows an illustration of the measuring principle on which the vehicle impact detection sensor system of FIGS. 1a and 1b is based.

FIG. 2 serves to explain the Doppler frequency measuring principle, which is the basis of determining the relative movement between a surface 3 reflecting radar waves, such as here, the electrically conducting outer skin of the door, and the impact detection sensor system 1 with radar transmitter and receiver. If the reflecting surface 3 moves at a speed v relative to the vehicle impact detection sensor system 1, received radar waves which are emitted by the vehicle impact detection sensor system 1 at the transmit frequency $f_s$ and retroreflected by the reflecting surface 3 to the impact detection sensor system, have a received frequency of $f_E=f_s(1+2v/c)$, v being the absolute value of the speed with which the reflecting surface 3 moves towards the transmitter, and c denoting the speed of light. By measuring the Doppler frequency $f_d=f_E-f_s=2f_sv/c$, it is therefore possible to determine the relative speed $v=cf_d/(2f_s)$ of the impact detection sensor system 1 and reflecting surface 3 in the case of a known transmit frequency $f_s$.

Figure 3:
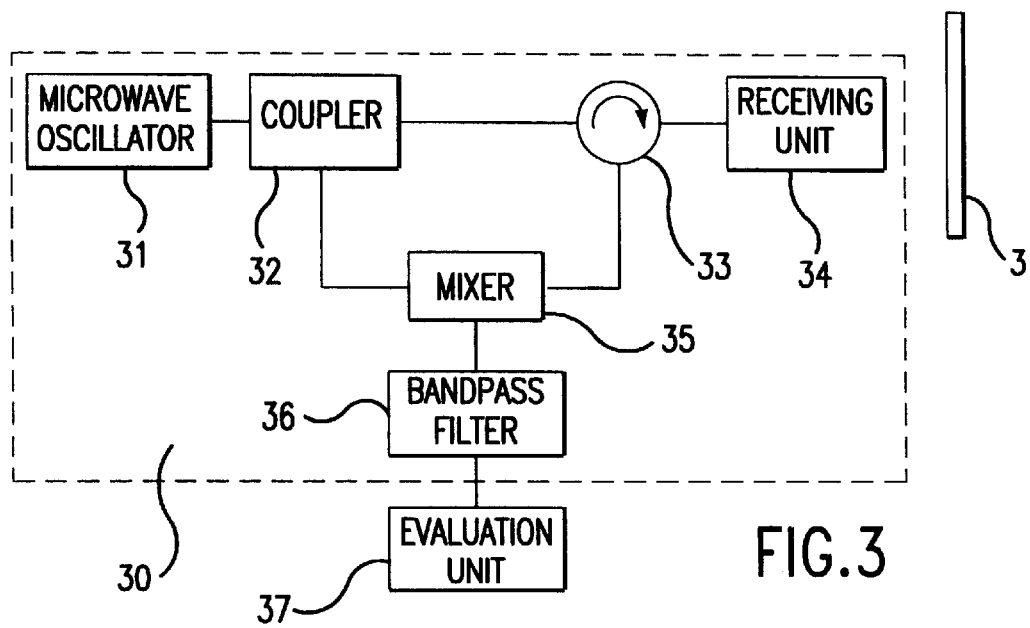
FIG. 3 shows a block diagram of a first exemplary embodiment of the vehicle impact detection sensor system and, FIG. 4 shows a block diagram of a second exemplary embodiment of the vehicle impact detection sensor system.

A block diagram of a first exemplary embodiment of the vehicle impact detection sensor system 1 is illustrated in FIG. 3. It comprises a Doppler frequency evaluation unit 30 having a microwave oscillator 31 which feeds microwaves via a coupler 32 and a circulator 33 to a transmitting and receiving unit 34 which emits said microwaves as radar waves in the direction of a reflecting surface, such as the door outer skin 3, and receives radar waves reflected from the latter. The coupler 32 couples out a portion of the microwave power supplied by the oscillator, and feeds it to a mixer 35 in which the coupled-out microwave signal is mixed with the microwave signal of the reflected radar waves received by the transmitting and receiving unit 34 and fed via the circulator 33. Usually, the mixer 35 is formed by a nonlinear component, for example a microwave diode, which has a curved current/voltage characteristic, with the result that the Fourier spectrum at the output of the mixer 35 comprises the aggregate and differential frequencies of the signals fed.

Arranged at the output of the mixer 35 is a bandpass filter 36 which serves the purpose of filtering out the differential frequency signal of the signals of the coupler 32 and circulator 33, and of suppressing the DC fraction thereof and the low-frequency signal component, which corresponds to no relative speed, or only a very low one. The frequency of this differential frequency signal represents the desired Doppler frequency and is determined by simple frequency counting in an evaluation unit 37 arranged at the output of the bandpass filter 36. Furthermore, also provided in the evaluation unit 37 is a computer unit (not explicitly shown) which, given knowledge of the frequency of the oscillator 31 stored for this purpose in a memory, determines in accordance with the relationship explained above with reference to FIG. 2 the relative speed at which the reflecting surface 3 moves relative to the vehicle impact detection unit 30.

Since the information on the phase angle of the signals from the coupler 32 and circulator 33 are lost in the mixer 35, the evaluation unit 37 calculates only the absolute value of the relative speed of the vehicle impact detection sensor system 30 and reflecting surface 3. By contrast, it is not detected whether the vehicle impact detection sensor system 30 and the reflecting surface 3 are moving towards one another or are moving apart from one another. However, for the purpose of detecting an impact situation it is sufficient as a rule to know the absolute value of the relative speed of the vehicle impact detection sensor system 30 and the reflecting surface 3, since an impact in the door region of the motor vehicle normally causes an intrusion into the doors in the case of which the reflecting door outer surface 3 moves towards the vehicle impact detection sensor system 30. The evaluation unit 37 generates an impact-indicating output signal when the calculated absolute value of the relative speed of the vehicle impact detection sensor system 30 and reflecting surface 3 exceeds a prescribed threshold value, or when, alternatively, the relative speed of the vehicle impact detection sensor system 30 and reflecting surface 3 is within a prescribed range of values. This impact-indicative output signal can either be used directly to activate an active occupant protection system, or to form an input variable for an activation logic unit of an active occupant protection system which, for example, is fed still further signals by acceleration sensors for deciding on activating the active occupant protection system.

A modification of the above exemplary embodiment for the vehicle impact detection sensor system consists in not releasing the active occupant protection system in the case of the outlined exceeding of the threshold value of the relative speed of the vehicle impact detection sensor system and reflecting surface 3, but in integrating this relative speed, and thus determining the deformation path of the reflecting surface, in order to activate the active occupant protection system when this deformation path exceeds a prescribed threshold value. In a further modified exemplary embodiment, it can be provided to take account both of the relative speed and of the deformation path of the reflecting surface 3 for the purpose of generating the impact-indicative output signal of the evaluation unit 37.

Figure 4:
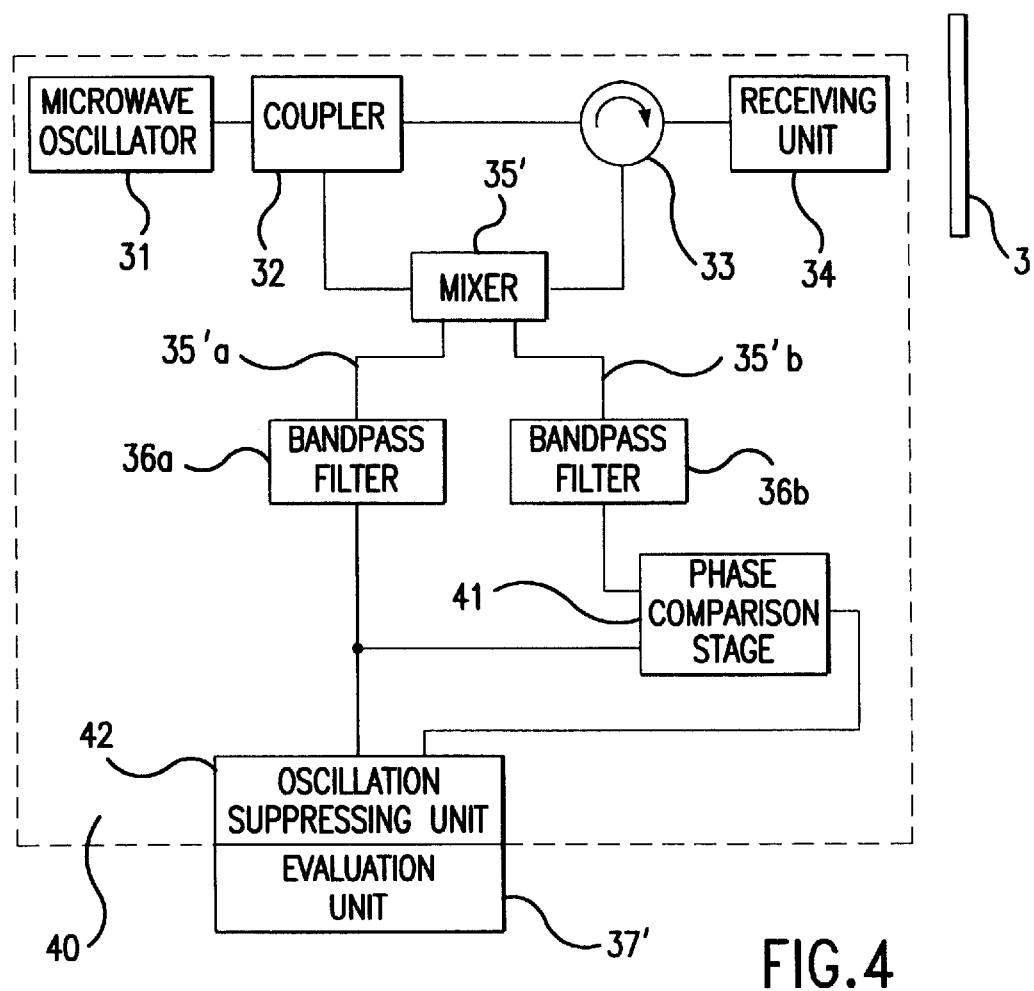

FIG. 4 shows a block diagram of a further possible exemplary embodiment of the impact detection sensor system 1. To the extent that there are provided therein modules which correspond to modules of the exemplary embodiment of FIG. 3, they are provided with the same reference numerals. The core of this exemplary embodiment is a Doppler frequency evaluation unit 40 which differs from the Doppler frequency evaluation unit 30 from FIG. 3 in the provision, for the purpose of mixing the signals from the coupler 32 and circulator 33, of a mixer 35' which is constructed as an I/Q mixer and provides at the outputs 35'a and 35'b both real and imaginary parts of the aggregate and differential frequency signal. Both signals are filtered in one bandpass filter 36a and 36b each for the purpose of obtaining the differential frequency, and thus the desired Doppler frequency range, and are freed from interfering DC signal components.

The outputs of the bandpass filters 36a and 36b are connected to a phase comparison stage 41 which permits the "sign" of the Doppler frequency to be determined. If the vehicle impact detection sensor system 40 and the reflecting surface 3 are moving towards one another, the result is a phase shift in the signals at the outputs 35'a and 35'b of the I/Q mixer 35' of $\pi/2$. If, by contrast, they are moving away from one another, this phase shift is $-\pi/2$, that is to say it is possible to infer the sign of the relative speed of the vehicle impact detection sensor system 40 and reflecting surface 3 by evaluating the phase shift in the signals at the outputs 35'*a* and 35'*b* of the I/Q mixer 35'. It is therefore possible to detect a vibration-induced oscillatory movement of the reflecting surface 3 relative to the vehicle impact detection sensor system 40, and thus to distinguish it from a relative movement which is to be ascribed to an impact-induced intrusion in a vehicle door.

In order to undertake this distinction, the output of the phase comparison stage 41 is connected to a oscillation-suppressing unit 42 which relays a Doppler frequency signal to an evaluation unit 37' only when no vibration state is present, that is to say no change in the sign of the phase difference of the signals at the outputs 35'*a* and 35'*b* of the I/Q mixer 35' occurs within a specific time interval. The further mode of operation of the evaluation unit 37' corresponds to that of FIG. 3, that is to say it uses the Doppler frequency to determine the speed and/or amplitude of the vehicle impact detection sensor system 40 and microwave-reflecting surface 3, and produces a corresponding output signal.

In a modification of this exemplary embodiment, the evaluation unit 37' is also fed the sign information of the relevant relative movement, with the result that it is also possible, by upward integration, to determine an absolute value of the spacing of the vehicle impact detection sensor system and reflecting surface 3, that is to say the deformation path. This renders it possible to generate an impact-indicative output signal when, for example, the determined deformation path deviates from a standard value by more than a threshold value, or when both the determined deformation path and the determined relative speed of the vehicle impact detection sensor system and reflecting surface 3 fall outside a prescribed range of values.

If, as in the example of FIGS. 1*a* and 1*b*, the vehicle impact detection sensor system 1 is arranged at an inner cavity, the irradiated radar waves propagate therein by multiple reflexions and fill the cavity uniformly. Denting of the boundary surface, such as the door outer skin 3, here, at any point on the cavity then gives rise to a Doppler signal on the part of the vehicle impact detection sensor system 1. In this way, it is possible to monitor a large two dimensional region of the vehicle outer skin for impacts, without the need for a radar transmitter which emits over a correspondingly wide surface. The vehicle impact detection sensor system 1 need not, moreover, necessarily be accommodated in a cavity in the body, but can also be held by a sleeve-like inclusion at a suitable site on the vehicle. Such a sensor with a sleeve can be arranged, for example, at exposed sites on a motor vehicle where, depending on the size of the irradiated surface area, it bounds the surface which is sensitive to impact detection, the result being to create the possibility of determining the exact location of an impact on the motor vehicle. This renders it possible to drive active occupant protection systems as a function of the impact situation, and to output an input variable for an activation logic system of an active occupant protection system as a function of the detected intrusion location.

Although the invention has been described in detail with reference to certain preferred embodiments and specific examples, variations and modification exist within the scope and spirit of the invention as described and as defined in the following claims.

What is claimed is:

1. A vehicle impact detection sensor system for an active occupant protection system, the vehicle impact detection system having
   a radar transmitter and a radar receiver which are arranged on a sensor-carrying superstructure of the vehicle, the radar receiver receiving radar waves which are emitted by the radar transmitter and reflected at an impact-relevant reflexion surface permanently connected to the vehicle which moves relative to the sensor-carrying superstructure in the event of an impact, and
   a Doppler frequency evaluation unit responsive to the frequency of the transmitted radar waves and the frequency of the radar waves reflected from the impact-relevant reflexion surface to determine the associated Doppler frequency and detecting therefrom a relative movement of the impact-relevant reflexion surface with reference to the sensor-carrying superstructure and determining if an impact is occurring based on the relative movement of the impact-relevant reflexion surface with reference to the sensor-carrying superstructure.

2. The vehicle impact detection sensor system according to claim 1 further including means for detecting an oscillatory movement of the impact-relevant reflexion surface.

3. The vehicle impact detection sensor system according to claim 1 wherein the radar transmitter is arranged in such a way that it emits radar waves into a cavity of the vehicle which is bounded at least partly by the impact-relevant reflexion surface.

4. The vehicle impact detection sensor system according to claim 2 wherein the radar transmitter is arranged in such a way that it emits radar waves into a cavity of the vehicle which is bounded at least partly by the impact-relevant reflexion surface.

5. The vehicle impact detection sensor system according to claim 1 wherein the impact-relevant reflexion surface is an outer surface of the vehicle.

6. The vehicle impact detection sensor system according to claim 3, wherein the cavity is a hollow structure in the vehicle formed by a frame longitudinal member of the vehicle and a frame cross member of the vehicle.

* * * * *